UNITED STATES PATENT OFFICE.

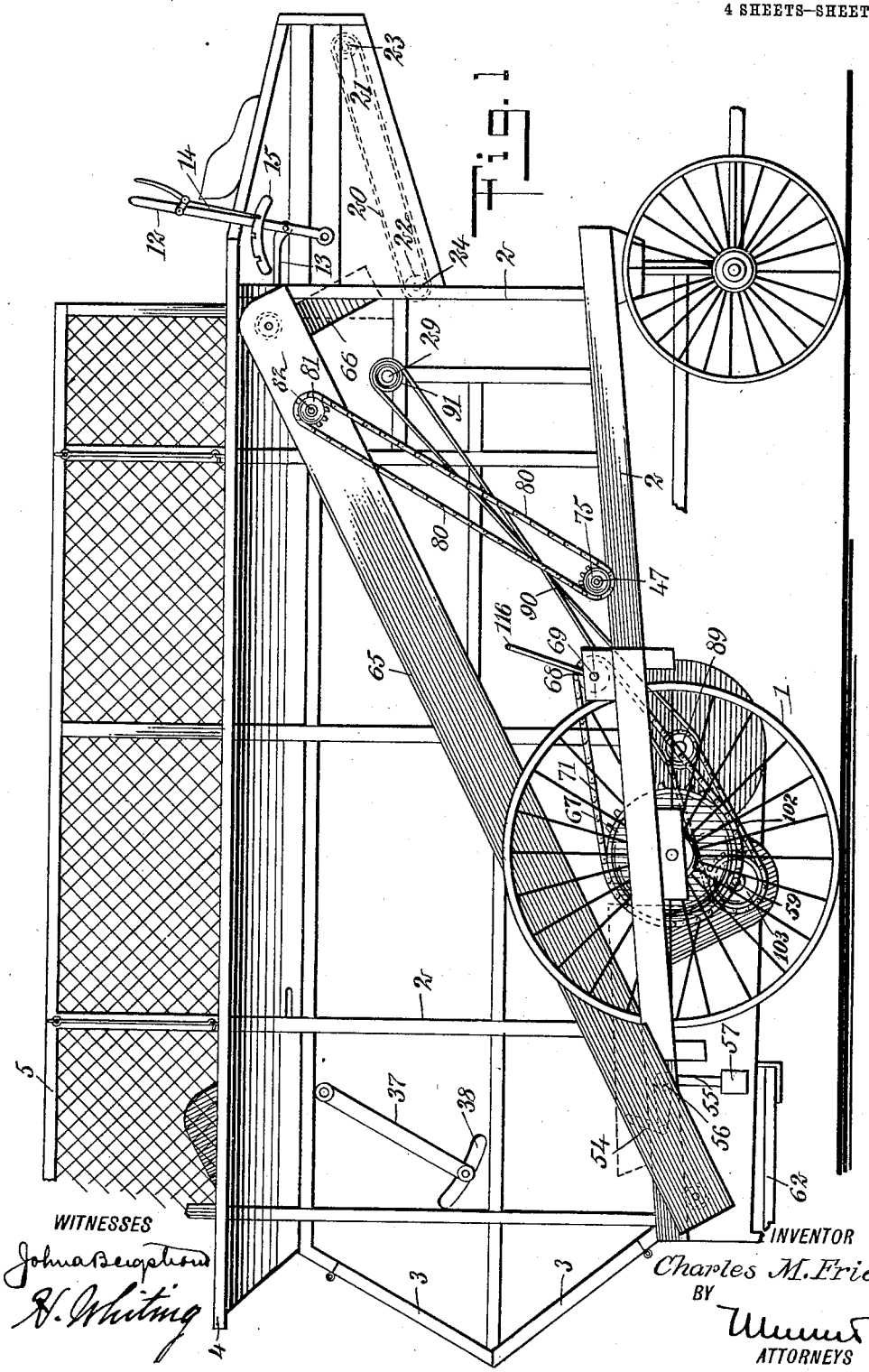

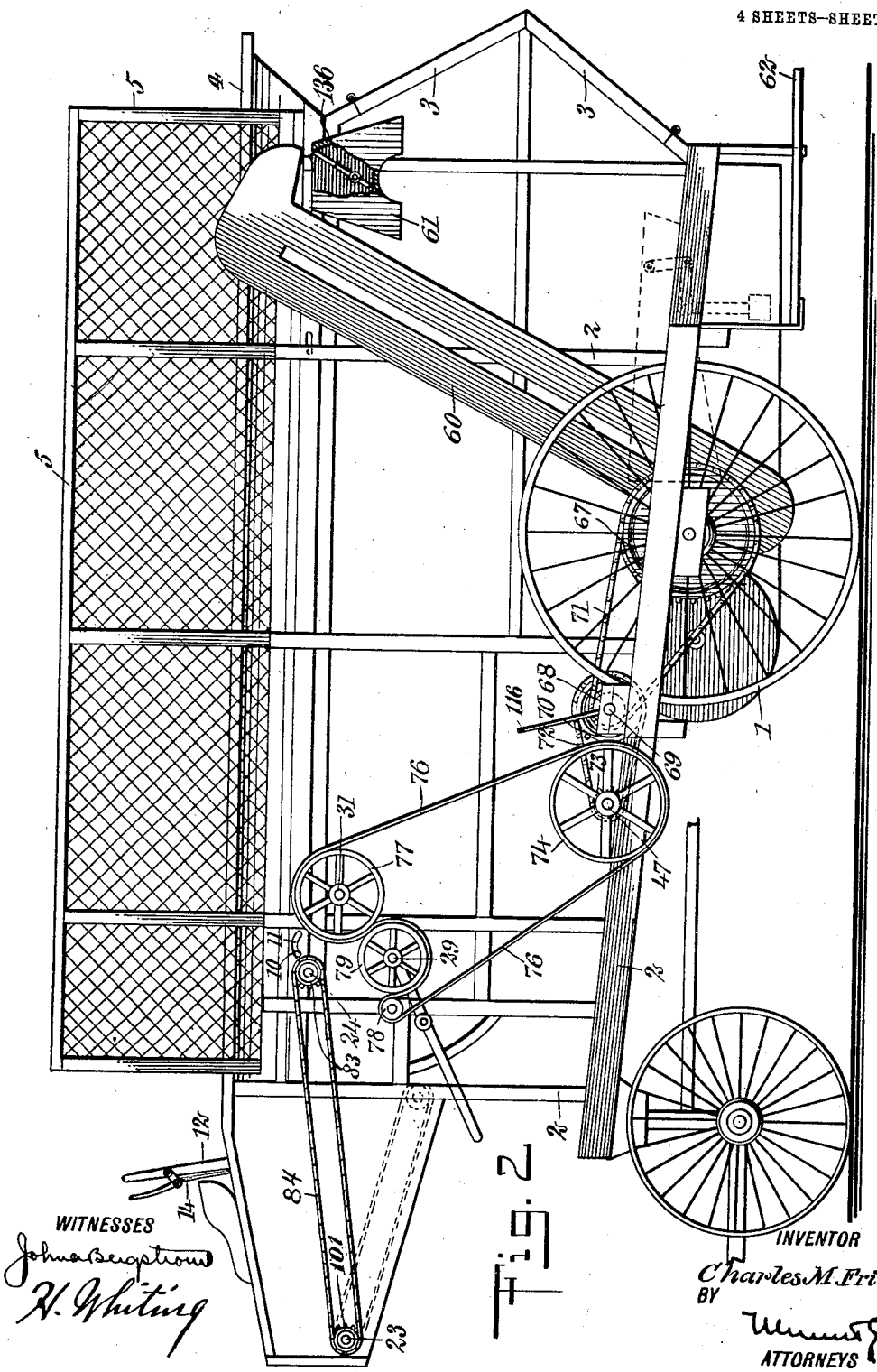

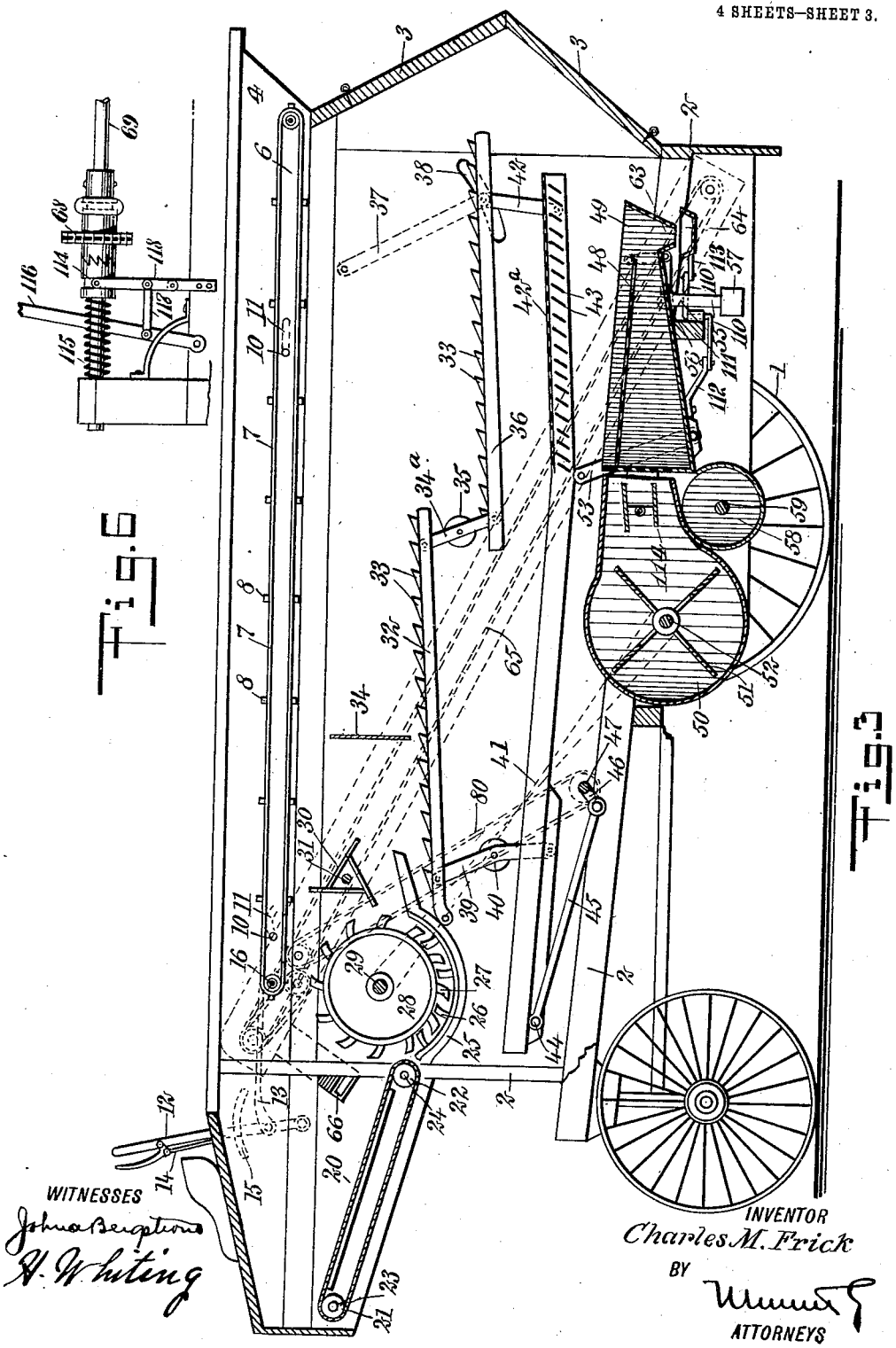

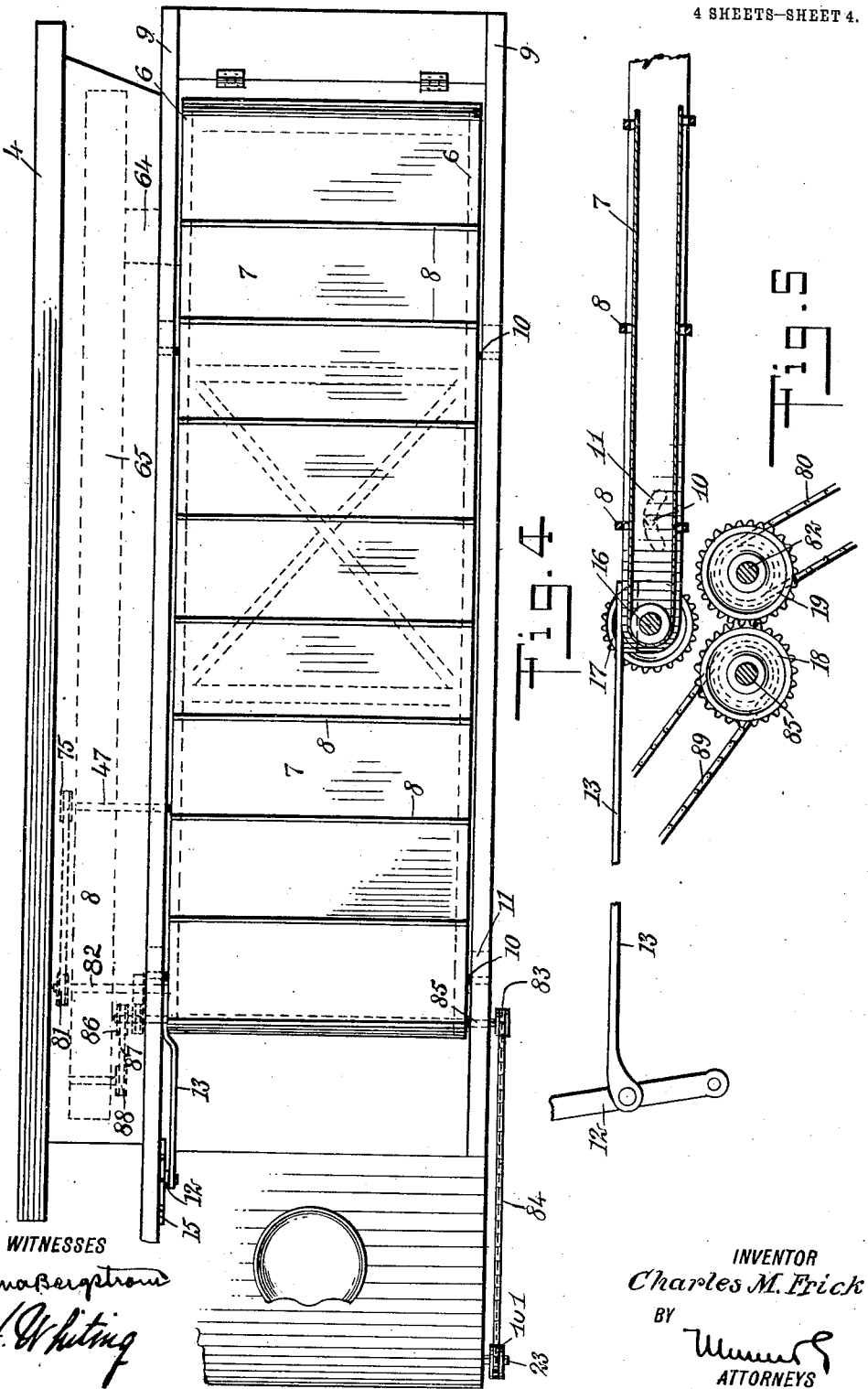

CHARLES MORIZ FRICK, OF TOWNSHIP 23, PAWNEE COUNTY, KANSAS.

THRESHING-MACHINE.

999,640. Specification of Letters Patent. Patented Aug. 1, 1911.

Application filed September 9, 1909. Serial No. 516,832.

*To all whom it may concern:*

Be it known that I, CHARLES M. FRICK, a citizen of the United States, and a resident of the southeast quarter of Section 30, Township 23, Range 15, west, in the county of Pawnee and State of Kansas, have invented a new and Improved Threshing-Machine, of which the following is a full, clear, and exact description.

This invention relates to a threshing machine to be used in connection with a harvester, and is adapted to run along with the harvester over the field and thresh the grain received from the harvester.

One of the principal features of this invention is to provide a feeding conveyer which may be thrown in one position so as to feed the material to the threshing part of the machine, or may be shifted to another position, in which it feeds the material over the end of the threshing machine onto the ground. This is for the purpose of controlling at will the conveying of the material harvested, so that the cuttings from a patch of weeds may be thrown over the rear of the threshing machine, and not run through the threshing mechanism.

Another feature of this invention is the provision of a screen for shifting the grain from the chaff, which will be automatically maintained in a substantially horizontal position irrespective of whether the machine is going up or down hill.

These and other features will be more fully described hereinafter and particularly set forth in the claims.

Reference is to be had to the accompanying drawings, forming a part of this specification, in which similar characters of reference indicate corresponding parts in all the views, and in which—

Figure 1 is a side view in elevation; Fig. 2 is also a side view in elevation, taken from the side opposite to Fig. 1; Fig. 3 is a vertical longitudinal section; Fig. 4 is a top plan view; Fig. 5 is an enlarged detail, showing the driving mechanism for the feed conveyer which permits it to be driven in either direction, and Fig. 6 is a fragmentary view in elevation, showing the method of clutching the drive sprocket to the counter shaft.

The device consists in a carriage which is adapted to be pulled over the field by a number of horses or mules, and obtains its power in this case from the rear wheels 1 of the carriage. Supported at the front and rear wheels of the carriage is a suitable frame 2, which has openings in the rear, closed by doors 3, to permit access to the mechanism within the frame 2. At one side of the top of the frame, there is provided a guard-rail 4, over which the grain is adapted to be thrown by the conveyer or elevating mechanism on the harvester. On the opposite side, there is provided a screen 5, which prevents the wind and throw of the elevating mechanism of the harvester or header, from throwing the cut grain clear over the thresher. Between the two sides thereof and extending longitudinally of the frame 2 is a shiftable frame 6, on which is rotatably supported an endless conveyer 7, which may be of any suitable form, but is preferably a flight conveyer, having flights 8 thereon. The frame 6 is supported from longitudinal beams 9 on the frame 2 by means of pins 10, which extend in arcuate slots 11. The conveyer 7 extends over the side members of the frame 6, so as to form a complete conveying surface between the beams 9.

The conveyer frame 6 is shifted in its arcuate supporting slots by means of a lever 12 suitably pivoted at the front end of the machine, and connected thereto by a link 13. The lever 12 may be held in one of three positions by means of a lock 14, which engages in notches on an arcuate lock-bar 15, suitably secured to the side of the frame 2. The conveyer is driven by means of a shaft 16, which has on the end thereof a gear 17, which is adapted to engage with either one of a pair of intermeshing gears 18 and 19. In the extreme throw of the lever 12, to the right in Fig. 5, the gear 17 will mesh with the gear 19 and be driven so as to feed the material on the conveyer off the rearward end of the thresher. In the intermediate position of the lever 12, the supporting pins 10 will be at the top and middle point of the arcuate slots 11, and the conveyer will be held up in the position shown in Fig. 5, the gear 17 being out of engagement with both the gears 18 and 19. By throwing the lever 12 to its extreme left position, the gear 17 is brought into mesh with the gear 18, and thus the conveyer 7 will travel in the opposite direction, so that it feeds toward the front of the thresher and onto a short conveyer 20, which is rotatably supported in any suitable manner at its ends, as by rollers 21 and 22 on shafts 23 and 24. The material fed to the conveyer 20 is advanced in the opposite direction into a concave casing 25, which has upwardly-extending teeth 26 on its inner surface, which are adapted to co-act with teeth 27 on a cylinder 28, suitably supported above the concave 25 on a shaft 29.

Just beyond the cylinder 28 and adapted to engage the material coming therefrom is a rotary beater 30, which is suitably supported on a shaft 31. The material, after passing under the beater 30, falls onto a shaker 32, which is adapted to feed the material toward the rear by means of its rearwardly-pointed teeth 33. Directly above the shaker 32, there is provided a baffle plate 34, which is preferably in the form of a canvas curtain, and is adapted to prevent the grain from being thrown clear to the rear of the threshing machine by the rapid revolutions of the cylinder and beater.

For the purpose of supporting the shaker 32 at its rear end, there are provided levers 34ª, pivotally connected to the shaker 32 at one end, and pivoted in boxes 35 on either side of the thresher frame at intermediate points, and also pivotally connected at its other end to another shaker 36, which is similar to the shaker 32, and is supported at its rear end by a pair of pivoted hangers 37, which are hinged to the outside of the thresher frame, and has the means whereby it is connected to the shaker 36 extending through slots 38 in the sides of the thresher frame.

The front end of the shaker 32 is supported by bell-crank levers 39, which are pivoted thereto, and also pivoted intermediate its ends in a box 40 on the side of the thresher. The other end of these bell-crank levers 39 extend downwardly and are pivoted to a shaking member 41, which serves to shake the shaker 32 through the bell-crank levers 39. This shaking member 41 is supported at its opposite ends from the shaker 36 by means of links 42. Spaces are provided between the teeth 33 on the shakers 32 and 36 to permit the grain stripped from the stalks by the cylinder 28 and the beater 30 to fall through onto the shaking member 41. Slots may also be provided in the concave 25 to permit the grain stripped from the stalks by the cylinder 28 to fall through onto the shaking member 41. The shaking member 41 slopes from the front toward the rear to a point where it slopes from the rear toward the front, forming an obtuse angular surface, which prevents the grain thereon from going over the rear end. There is provided in the rear end of this shaking member 41 a screen 42ª, which is adapted to sift the grain from the chaff, and has on its under side, co-acting therewith, deflectors 43, which are adapted to deflect the grain away from the rear end of the harvester. In order to reciprocate the shaking member 41, there is pivoted thereto at 44 a connecting link 45, which is actuated by a crank 46 suitably secured to a shaft 47. The grain and some little chaff passing through the screen 42ª, falls onto a screen 48 on an adjustable shoe 49, where it is subjected to the action of a fan blower 50, the fan 51 of which is secured to a shaft 52. The force and direction of the air from the blower fan 51 are regulated by means of a plurality of vanes 114 which are pivotally secured in the blower frame in any well-known manner. The shoe 49 is pivotally supported at one end by links 53, which are in turn pivotally connected to the thresher frame. At the other end there is pivotally connected to the shoe 49 a connecting link 54, which is pivoted at its other end to bell-crank levers 55, said bell-crank levers 55 being pivoted at 56 to the thresher frame, and having secured to the other arms thereof, weights 57. These weights 57 tend to keep the arms of the bell-crank levers 55 to which they are attached always in a vertical position. This forces the other arms of the bell-crank levers to remain in a substantially horizontal position, and thus serves to keep the shoe 49 always in a substantially horizontal position, so that the screen 48 therein is kept at the same angle no matter whether the harvester is going up-hill or down-hill. The grain passing through the screen 48 on the shoe 49 falls down the inclined surface of the shoe into a screw-conveyer 58, which is secured to a shaft 59. The screw conveyer extends under the harvester to the opposite side thereof, where it leads into the shoe of a sacker elevator 60, which delivers the grain from the screw-conveyer to a sacker 61, which is situated directly above a platform 62, on which the operator stands and removes the sacks, as they are filled from the sackers. The sacker 61 has two spouts and a deflector 136, to divert material from full to empty sacks.

Going back to the screen 58 on the shoe 49, that portion of the chaff which is not completely blown away from the shoe but is blown over the end of the screen 48 falls through the hopper portion 63 of the shoe into a chute 64, which carries the chaff, and possibly some grain, over to the farther side of the harvester, where it is deposited in a return elevator 65. The chute 64 is supported at either side in a pivoted bail 135, so as to shake endwise. It receives this shaking motion from a bell-crank lever 110 which is pivoted to a cross beam 111 on the frame and is connected at one end to the shoe 49 by means of a link 112 and at the other end to the chute 64 by means of a link 113. The return elevator 65 may be of any suitable form, preferably an endless flight conveyer, and has at the top thereof a spout 66, which receives the material from the conveyer, and is adapted to deliver it on top of the short feed-conveyer 20, so that it may go through the cylinder, and any grain which remains therein may be gleaned out from the chaff. In this form of the machine, the drive is obtained from the rear wheels by means of sprocket wheels 67 secured to the hubs of said wheels. From these sprocket wheels there are driven by means of chains 71 small sprocket wheels 68 loosely mounted on a counter-shaft 69. In order to drive the shaft 69 from the sprocket wheels 68 there is provided at each end of the shaft a mechanism for clutching the sprocket wheels 68 to the shaft 69. One of these clutching mechanisms is shown in detail in Fig. 6. The sprocket wheels 68 are each provided with a toothed clutch face which engages a clutch 114$^a$ splined upon the shaft 69, the latter being normally held in engagement with the former by means of a spiral spring 115. To draw each of the clutches 114$^a$ out of engagement with the sprocket wheels 68 there are provided levers 116 pivotally connected to the frame and slidingly connected to the clutches 114$^a$ by means of links 117 and levers 118. Another sprocket wheel 70 is secured to the counter-shaft 69, and in turn drives through a drive-chain 72 a sprocket-wheel 73 on the shaft 47. The shaft 47, as has been described above, reciprocates the shaking member 41, which in turn reciprocates the shakers 32 and 36. The shaft 47 extends through the harvester and projects on both sides thereof. On one end there is secured a belt-pulley 74, and on the other end is secured a sprocket wheel 75. The belt pulley 74 drives by means of a belt 76 belt pulleys 77 and 78, the tension on the belt 76 being regulated by means of an idle pulley 79. The belt pulleys 77 and 78 are fixed to the shafts 31 and 29, and thus drive the beater 30 and the cylinder 28, which are also fixed on these shafts. The sprocket wheel 75 which has been described as being secured to the other end of the shaft 47, drives through an endless chain 80 a sprocket wheel 81, which is secured to a shaft 82, rotatably supported at the side of the harvester. The gear 19, previously mentioned, is also secured to the shaft 82 and driven thereby, and it in turn drives the intermeshing gear 18, which is secured to a shaft 85, and on which is also secured a sprocket wheel 86, which is adapted to drive through a chain 87 a sprocket wheel 88. This latter is for the purpose of driving the return elevator 65. The shaft 85 also extends beyond the opposite side of the machine, and has a sprocket wheel 83 secured thereto, which drives, by means of a chain 84, a sprocket wheel 101 on the shaft 23, thereby driving the feed conveyer 20.

In order to drive the fan 51, there is provided on the end of its shaft 52 a belt pulley 89, which is engaged by a cross belt 90, the latter being driven by a belt pulley 91 secured to the end of the shaft 29. On the shaft 52, there is also provided a sprocket wheel, which drives, by means of a chain 102, a sprocket wheel 103 on the screw conveyer shaft 59, and thereby drives the screw conveyer 58 and the elevator 60.

In the operation of the device, the grain cut by the harvester is thrown up by the elevator and deposited within the guard rail 4, and is prevented from going over beyond the opposite side of the thresher by means of the screen 5. In the ordinary running of the device, the conveyer 7 feeds toward the front end of the thresher, and is driven by means of the gear 17 meshing with the gear 18. In case, however, the harvester comes to a patch of weeds, the conveyer 7 may be forced to feed in the opposite direction over the tail end of the thresher, by throwing the gear 17 into mesh with the gear 19. If the threshing mechanism becomes overloaded, the middle position of the gear 17 may be used to prevent the conveyer from driving in either direction until it is desired to again feed more material to the threshing mechanism. The material fed toward the front end of the thresher by means of the feeding conveyer 7 drops onto the auxiliary feeding conveyer 20, which is adapted to carry the material into the concave 25, where it is subjected to the stripping action of the teeth on the concave and the cylinder 28. From here it passes under the action of the beater 30, which strips the grain from the straw, and deposits the whole onto the shaker 32, which advances it gradually until it comes to the shaker 36, the grain falling through to the shaking member 41 below. The straw is advanced over the shakers 32 and 36 until it comes to the rear of the shaker 36, where it falls over the edge thereof and drops down through the opening in the bottom of the thresher to the ground. The grain and some little chaff on the shaking member 41 is advanced until it comes over the screen 42, where the smaller particles pass through, and the larger particles are thrown over the edge thereof and fall to the ground. The smaller particles of grain and chaff which come through the screen 41$^a$ fall onto the screen 48 on the shoe 49. This shoe is always kept horizontal by means of the pendulum weight 57, no matter whether the thresher is going up or down an incline. Here the grain and chaff are submitted to the blowing action of the fan 51, and the light chaff blown over beyond the end of the shoe 49. The grain passes through the screen 48 and falls into the screw-conveyer 58, from whence it is carried to the sacker elevator 60, which deposits it in the sacker 61, from whence it is deposited in suitable sacks.

Some of the material that comes to the screen 48 still has considerable chaff and grain mixed; this is dropped over the edge of the screen 48 through the hopper 63 and into the chute 64, from whence it slides into the return elevator 65. This material is carried up the return elevator 65 to the spout 66, which delivers it onto the auxiliary feed conveyer 20, to be again passed through the threshing mechanism and further treated, to separate the grain from the chaff.

Having thus described my invention, I claim as new and desire to secure by Letters Patent:—

1. In a device of the class described, the combination with a threshing mechanism, of a feed conveyer for said threshing mechanism, means for driving said threshing mechanism, means for driving said conveyer, means for throwing said conveyer into and out of driving connection, and means for reversing said conveyer.

2. In a device of the class described, the combination with threshing mechanism, of a feed conveyer for said threshing mechanism, a shaft adapted to drive said threshing mechanism, a pair of intermeshing gears adapted to be driven by said drive shaft, a gear adapted to drive said feed conveyer, and means for throwing said last-mentioned gear into gear with either of said intermeshing gears so as to drive said feed conveyer in either direction.

3. In a device of the class described, the combination with a threshing mechanism, of a feed conveyer for said threshing mechanism, a frame for supporting said threshing mechanism, means for shiftably supporting said conveyer, a gear adapted to drive said conveyer, a plurality of gears adapted to drive said first-mentioned gear, and means for throwing said first-mentioned gear into and out of working relation with both of said last-mentioned gears.

4. In a device of the class described, the combination with a threshing mechanism, of a feed conveyer for said threshing mechanism, means for adjusting said feed conveyer, means for holding said feed conveyer in its adjusted position, means for driving said threshing mechanism, and means connected with said last-mentioned means adapted to drive said feed conveyer in either direction.

5. In a device of the class described, the combination with a threshing mechanism, of a frame for said threshing mechanism having arcuate slots therein, pins adapted to slide in said slots, a conveyer frame carried by said pins, a conveyer on said frame, a lever adapted to reciprocate said conveyer into a plurality of adjusted positions, means for locking said lever in any of its adjusted positions, means for driving said conveyer in one direction in one of its adjusted positions, and means for driving said conveyer in the opposite direction in another of its adjusted positions.

6. In a device of the class described, the combination with a threshing mechanism, of a feed conveyer for said threshing mechanism, a plurality of driving members for said feed conveyer, and means for moving said feed conveyer bodily so as to bring said feed conveyer into driving connection with any one of said driving members.

7. In a device of the class described, the combination with a threshing mechanism, of a feed conveyer for said threshing mechanism, and means for controlling the feeding motion of said conveyer by moving said conveyer bodily.

In testimony whereof I have signed my name to this specification in the presence of two subscribing witnesses.

CHARLES MORIZ FRICK.

Witnesses:
 WILLARD FELTZ,
 CHARLES GRAEBNER.

---

Copies of this patent may be obtained for five cents each, by addressing the "Commissioner of Patents, Washington, D. C."